(12) United States Patent
Macchi et al.

(10) Patent No.: US 6,794,066 B2
(45) Date of Patent: Sep. 21, 2004

(54) OPTICAL ELEMENT WITH MIRROR COATING AND METHOD FOR FORMING SAID COATING

(75) Inventors: Marco Macchi, Tradate (IT); Sabrina Malnati, Varese (IT); Brandon Yip, Blackwood (AU)

(73) Assignee: Sola International Holdings, Limited, Lonsdale (AU)

( * ) Notice: Subject to any disclaimer, the term of this patent is extended or adjusted under 35 U.S.C. 154(b) by 97 days.

(21) Appl. No.: 10/122,353

(22) Filed: Apr. 16, 2002

(65) Prior Publication Data

US 2002/0181108 A1 Dec. 5, 2002

Related U.S. Application Data

(63) Continuation-in-part of application No. PCT/EP01/07170, filed on Jun. 25, 2001.

(30) Foreign Application Priority Data

Jul. 7, 2000 (EP) .............................................. 00114611

(51) Int. Cl.$^7$ ................................................. B32B 9/00
(52) U.S. Cl. ................... 428/701; 428/412; 428/423.1; 428/522; 428/500; 428/532
(58) Field of Search .............................. 428/701, 412, 428/423.1, 522, 500, 532, 415; 351/159

(56) References Cited

U.S. PATENT DOCUMENTS

| | | |
|---|---|---|
| 2,394,533 A | 2/1946 | Colbert et al. |
| 2,758,510 A | 8/1956 | Auwärter |
| 3,410,625 A | 11/1968 | Edwards |
| 3,679,291 A | 7/1972 | Apfel et al. |
| 3,901,997 A | 8/1975 | Groth |
| 3,978,272 A | 8/1976 | Donley |
| 4,022,947 A | 5/1977 | Grubb et al. |
| 4,172,156 A | 10/1979 | Ritter et al. |
| 4,954,591 A | 9/1990 | Belmares |
| 5,054,902 A | 10/1991 | King |
| 5,316,791 A * | 5/1994 | Farber et al. ................ 427/164 |
| 5,704,692 A | 1/1998 | Purdy et al. |
| 5,719,705 A * | 2/1998 | Machol ....................... 427/164 |
| 5,846,650 A | 12/1998 | Ko et al. |
| 6,077,569 A | 6/2000 | Knapp et al. |
| 6,258,218 B1 | 7/2001 | Burton |
| 6,334,681 B1 | 1/2002 | Perrott et al. |

FOREIGN PATENT DOCUMENTS

| | | | |
|---|---|---|---|
| DE | 39 28 939 | | 3/1990 |
| EP | 0 456 488 A1 | | 11/1991 |
| GB | 1074655 | | 7/1967 |
| GB | 1 261 242 | | 1/1972 |
| GB | 2 268 509 | | 12/1994 |
| JP | 10-039104 | * | 2/1998 ............ G02B/1/11 |

OTHER PUBLICATIONS

Dr. A. Ross, Structure and properties of Thin Layers With Reference to Their Use in Ocular Optics, article, 1957.

* cited by examiner

Primary Examiner—James J. Seidleck
Assistant Examiner—Melanie Bissett
(74) Attorney, Agent, or Firm—Burns, Doane, Swecker & Mathis, LLP

(57) ABSTRACT

The invention relates to coated optical elements, coatings therefor and methods of producing such coatings, the coatings having improved characteristics of adhesion and of resistance to abrasion. In a preferred embodiment the coating includes a plurality of superimposed layers, namely: a hardcoat layer, a thin adhesion layer, a first dielectric layer including a material having a high refraction index selected from the group comprising: $Cr_xO_y$, $TiO_2$, ZnSe, ZnS and mixtures thereof, wherein x is a number comprised between 1 and 2 and y is a number comprised between 1 and 3; and a second dielectric layer having a refraction index lower than the refraction index of the second material.

21 Claims, 1 Drawing Sheet

OPTICAL ELEMENT WITH MIRROR COATING AND METHOD FOR FORMING SAID COATING

This application is a continuation-in-part of PCT/EP01/07170 filed on Jun. 25, 2001 in English which designates the United States.

FIELD OF INVENTION

The present invention relates to coated optical elements and to methods for forming said coating.

In the following description and in the appended claims, the term "lens element" is used to indicate any coated or uncoated, at least partially transparent element capable of allowing vision through the same, such as for example powered and unpowered sun lenses and ophthalmic lenses for spectacles, visors, slabs, protective shields, lens blanks and wafers for laminating with the foregoing. Typically, such lens elements include a substrate made of homogeneous glass or plastic, in particular of polycarbonate or diethylenglycolbis-allyl-carbonate, commercially available as CR 39™ (PPG Industries Inc.), both commonly used for manufacturing ophthalmic and non-ophthalmic lenses for glasses.

BACKGROUND

As is known, in the field of optical elements and in particular of lenses for spectacles it is useful to provide mirror coatings exhibiting, at the same time, a suitable adhesion, a good resistance to abrasion, a good reflectance, a low absorbance and, in some cases, a degree of coloration. According to the teaching of the prior art, desired characteristics of coloring and mirroring of the lens element are obtained by forming a coating including at least two layers of suitable materials on a transparent substrate of the lens element.

One type of conventional mirror coating consisting of two layers only—each layer has one or more specific functions. The first layer, generally consisting of a pure metal layer (e.g. chromium or aluminum) which functions both for adhering the coating directly to the substrate and for partially reflecting and partially absorbing light in the visible spectrum (400–700 nm). The second layer, generally consisting of silicon oxide, functions to impart a coloration to the lens and to impart a certain resistance to abrasion to the coating. The technologies used for manufacturing these low-cost two-layered coatings are those of physical vapor deposition, or PVD, based on a thermal evaporation mechanism wherein the heating of the material to be evaporated is substantially carried out by Joule effect. Although two-layered mirror coatings of the known type provide coloring and mirroring at a reasonable cost, nonetheless they possess the drawback, among others, of having properties of adhesion to the substrate and of resistance to abrasion which are not entirely satisfactory.

It is known in the art to provide a multi layer coating comprising a plurality of dielectric layers and dielectric interfaces. See, e.g., U.S. Pat. No. 3,679,291 to Apfel et al. Such "dielectric stacks" may be formed of alternating layers of high and low refractive index designed to provide desired optical properties such as the suppression of reflection. See, e.g., U.S. Pat. No. 5,719,705 to Machol assigned to Sola International, Inc. which discloses the use of alternating layers of titanium oxide and silicon dioxide deposited on a thin adhesion layer of chromium oxide.

Depending on the number and type of materials and the number and thickness of layers employed in conventional dielectric stacks, the coating may become relatively expensive and difficult to fabricate.

OBJECTS AND SUMMARY OF THE INVENTION

Accordingly, it is an object of the present invention to provide a readily and inexpensively formed coating for an optical element which is durable and can be tailored to produce desired reflectance properties.

It is another object of the present invention to provide a coating for an optical element having improved characteristics of adhesion and resistance to abrasion particularly with respect to conventional metal-dielectric two-layered coatings of the prior art.

According to the present invention, it has been found that the desired improvement of the characteristics of adhesion and of resistance to abrasion of the coating may be achieved by realizing the coating with a new combination of layers of suitable materials.

Thus, according to a first aspect thereof, the present invention provides coating for an optical element comprising a thin adhesion layer deposited on a surface of the lens element, a first dielectric layer having a refractive index substantially greater than the refraction index of the lens element at the surface and a second dielectric layer including a material having a refraction index substantially lower than the refraction index of the material of the first dielectric layer. The material of the first dielectric layer is selected from the group of $Cr_xO_y$, $TiO_2$, ZnSe ZnS and mixtures thereof wherein x is a number between 1 and 2 and y is a number between 1 and 3.

In this embodiment, the coating of the invention comprises alone, or in combination with other layers applied on the substrate, a sequence of at least three superimposed layers. A first relatively thin layer is intended for carrying out the function of adhesion to the substrate (or other intermediate coatings on the substrate) and does not appreciably affect the optical properties of the coated optical element. A second, dielectric layer forms two interfaces with adjoining material of different dielectric constants which reflect light. A third dielectric layer of a third material, produces interference effects and influences coloring of the optical element and, optionally, provides the desired resistance to abrasion.

Advantageously, thanks to said combination of layers, it is also possible to obtain a wider range of colors and a greater variety of shades with respect to those obtainable with the conventional two-layered coatings. The mirror-coated substrate of the invention is also easier to clean than the two-layered coatings of known type. Said advantageous feature may be attributed to the lower superficial roughness of the coating of the invention. Advantageously, due to its essential lack of absorption, the coating of the present invention exhibits a greater transmittance with respect to that of two-layered coatings, which permits the coating of dark substrates in a wider and more flexible way with respect to the prior art, while satisfying minimum transmittance requirements. This advantage is particularly appreciated in the case of lenses for sunglasses, since it is possible to widen the range of colors of the lens complying, at the same time, with the minimum transmittance limit of the coated lens, which limit is provided in the case of lenses to be worn when driving motor vehicles, and is fixed at 8% by the standards EN 1836, ANSI Z80.3 and As 1067.1.

Advantageously, the lower stiffness of the coating achieves better properties of adhesion, with reference to those possessed by the two-layered coatings of comparable cost.

In a preferred embodiment, and as it will better appear hereinafter, the optical element of the invention may be manufactured at a reasonable cost using conventional equipment and technology of vapor deposition. Preferably, the first thin layer has a thickness comprised between 0.5 and 5 nm and most preferably between 0.5 and 2 nm. For the purposes of the invention, the first material is preferably selected from the group comprising: Cr, Ti, SiO, $SiO_2$, $IN_2O_3$, $SnO_2$ and mixtures thereof. Among them, chromium is particularly preferred. Preferably, the first dielectric layer has a thickness comprised between 3 and 80 nm and most preferably between 8 and 50 nm. For the purposes of the invention, the material of the first dielectric layer is preferably selected from the group comprising: $Cr_xO_y$, $TiO_2$, ZnSe, ZnS and mixtures thereof, wherein x is a number comprised between 1 and 2, and y is a number comprised between 1 and 3. Among them, at least partially oxidized chromium is preferred. According to a preferred embodiment, the material of the first dielectric layer has a refraction index between 1.7 and 2.7. More preferably, the refraction index of this material is comprised between 1.9 and 2.4. In the present description, the refraction indexes of the different materials are intended as indexes measured at the wavelengths at which the respective materials are transparent or only weakly absorbent. Preferably, the second dielectric layer has a thickness between 5 and 400 nm and most preferably between 10 and 200 nm. For the purposes of the invention, the third material is preferably selected from the group comprising: SiO, $SiO_2$, $MgF_2$, $Na_5Al_3F_{14}$, and mixtures thereof. Preferably, the material of the second dielectric layer has a refraction index between 1.32 and 1.8 and more preferably between 1.4 and 1.7.

Preferably, the substrate essentially consists of a homogeneous transparent element of glass or plastic having a refraction index at 500 nm between 1.38 and 1.75. If the substrate is made of plastic, additional coatings may be applied to the substrate. Advantageously the coatings are a primer and a polysiloxane resin (hard coat) or other suitable material having the double function of imparting scratch-proof properties to the finished product, and of increasing the adhesion of the mirror coating. In this case the hard coat acts as a dielectric material which forms a dielectric interface with the first dielectric layer described above. For the purposes of the invention, the plastic substrate is preferably made of a material selected from the group comprising: acrylic-based polymers and copolymers, polymethylmethacrylate, polycarbonate, polyol-allyl-carbonates, cellulose esters, polyacrylates, polystyrene and polyurethanes. Among them, it is preferred to use an acrylic-based copolymer commercially available as Spectralite™ (Sola Optical), diethylenglycolbis-allyl-carbonate, commercially available as CR 39™ (PPG Industries Inc.), or polycarbonate, commonly used for manufacturing ophthalmic and non-ophthalmic lenses for glasses.

Preferably, the optical element is manufactured in the shape of lens or visor for glasses, or in the shape of a slab or protective shield. Where an edged lens is desired, the optical element may be a molded lens blank coated as described herein.

According to a second aspect thereof, the present invention provides a method for forming the coating described herein. Such a process may include the steps of placing an optical element such as a spectacle lens blank in a sealed chamber. The chamber is evacuated to a predetermined degree. The surface of the optical element is activated by means of ion discharge in an oxygen-containing environment for a predetermined period of time. A first, relatively, thin adhesion layer is deposited in substantial absence of oxygen. The first dielectric layer is then deposited in the presence of oxygen, especially by evaporating metal in the chamber which is incompletely oxidized as it is deposited. The second dielectric layer is then deposited to form a layer having a predetermined thickness. Additional dielectric layers may be formed as noted below.

In a preferred embodiment of the method coatings are formed on an optical element including adhesion and dielectric coatings formed by means of a process of physical vapor deposition carried out using conventional low-cost equipment and technologies usually employed in the manufacture of the two-layered mirror coatings. Advantageously, the adhesion layer and the first and second dielectric layers are formed by evaporating only two materials. In a preferred embodiment these materials are Cr and Si.

In this way it has been shown possible to attain unexpected, improved adhesion properties at a cost comparable to that attained by the methods for forming two-layered mirror coatings. In fact, even using the low-cost coating equipment and technologies usually employed in the manufacture of the two-layered superficial mirror coatings, the method of the present invention advantageously allows the production of improved mirror coated articles of a quality comparable to that of multi-layered coatings which are much more expensive and produced with sophisticated techniques, such as those based on the use of electronic guns. Moreover, this preferred manufacturing method of the present invention allows increase in the productivity with respect to the methods of the prior art employed for the manufacture of multi-layer coatings thanks to the reduced process time of this less sophisticated equipment.

The foregoing has been provided as a convenient summary of aspects of the present invention. However, the invention sought to be protected is defined by the claims.

DETAILED DESCRIPTION

Figure 1:
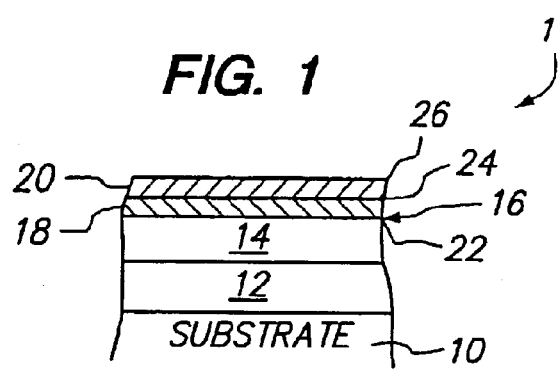
FIG. 1 is a cross-sectional view of a coated optical element of a preferred embodiment of the present invention.

FIG. 1 is a cross-sectional view of a preferred embodiment of an optical element 1 coated in accordance with teachings of the present invention. In this embodiment a homogenous plastic lens substrate 10 has a coating of five layers. A primer layer 12 and hardcoat layer 14 are applied preferably by spray or spin deposition. A thin adhesion layer 16, for example a 0.5 nm layer of Cr is vacuum deposited on the hardcoat layer 14. Two additional layers 18 and 20 are vacuum deposited. In preferred embodiments these are dielectric layers made of $Cr_xO_y$ and $SiO_2$ respectively. At least three interfaces between dielectric layers having substantially different refraction indices are formed at 22, 24 and 26.

Figure 2:
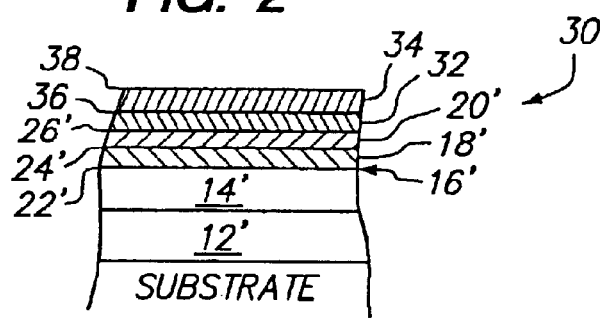
FIG. 2 is a cross-sectional view of a coated optical element of an alternate embodiment of the present invention.

FIG. 2 is a cross-sectional view of another embodiment of an optical element 30, wherein structures and materials similar to those of FIG. 1 are identified by like numerals. Four dielectric layers 18', 20', 32 and 34 are vacuum deposited on the optical element. At least five interfaces between layers having substantially different refraction indices are formed at 22', 24', 26', 36 and 38. Advantageously, layers 18' and 32 are formed of $Cr_xO_y$ and layers 20' and 34 are formed of $SiO_2$.

Equipment preferred for use in practicing the invention comprises, in particular.

a sealed chamber provided with an outer coil for heating/ cooling the same, a dome serving as a support for the blanks of the optical element to be coated, a plurality of metallic crucibles suitably connected to a current source which is adapted to heat the crucibles by Joule effect and, along therewith, to heat the material to be deposited onto the optical element housed therein.

a vacuum system in fluid communication with the sealed chamber, an adjusting device for feeding optional reactive gases (for example oxygen) and a ion discharge device for cleaning the optical element to be coated.

According to a preferred embodiment, the crucibles are preferably made of molybdenum and are covered by a removable shutter which closes the crucibles until the material to be evaporated reaches the desired evaporation temperature. Preferably, the optical element is positioned in a sealed chamber where a vacuum of between $2*10^{-5}$ and $1.5*10^{-4}$ mbar is reached.

In a preferred embodiment, the method of the invention provides for forming a metal adhesion layer (16,16') on the optical element (especially on the hard coat of the anterior face of a spectacle lens blank) followed by depositing on this adhesion layer a first dielectric layer essentially consisting of an oxide of the same metal or, alternatively, of a different metal. In the former case, it is preferable and advantageous to form the first dielectric (18, 18') layer by evaporating said metal in an oxygen-containing environment, so as to form the desired oxide layer "in situ", i.e., directly onto the underlying adhesion layer. Preferably, the first dielectric layer is formed in this case by adjusting the deposition rate of the second material in a range comprised between 0.05 and 0.15 nm/s. In this way, it is advantageously possible to obtain an oxide layer having the desired ratio between metal and oxygen, and to form, if desired, an incompletely oxidized layer, for example of $Cr_xO_y$ where the ratio of y to x is less than 3 to 2.

According to a preferred embodiment of the method of the invention, each deposition step of the first, adhesion layer and second and subsequent dielectric layers is carried out by evaporation and is preceded by a pre-heating step of the respective material. Conveniently, the pre-heating steps are adapted to bring each material to a pre-heating temperature close to that most suitable for effecting the evaporation and are carried out while maintaining the removable shutter of the crucibles in its closed position.

Preferably, both the pre-heating and evaporation steps are carried out by means of Joule effect so as to reach a temperature, which may be easily determined by those skilled in the art, that allows the carrying out of the deposition at the desired rate. According to a preferred embodiment, the pre-heating steps are carried out when the crucibles are made of molybdenum by feeding thereto a current having a value preferably comprised between 200 and 390 A.

Still more preferably, the current fed to the crucibles during the pre-heating steps has the following values:

i) of from 330 A and 370 A, most preferably equal to about 350 A, when pre-heating the adhesion layer material;

ii) of from 360 A and 400 A, most preferably equal to about 380 A, when pre-heating the first dielectric layer material;

iii) of from 200 A and 240 A, most preferably equal to about 220 A, when pre-heating the second dielectric layer material.

According to a preferred embodiment, the evaporation steps are carried out when the crucibles are made of molybdenum by feeding thereto a current having a value preferably comprised between 280 and 400 A.

Still more preferably, the current fed to the crucibles during the evaporation steps has the following values:

i) of from 360 A and 400 A, most preferably equal to about 380 A, when evaporating the adhesion layer material;

ii) of from 360 A and 400 A, most preferably equal to about 380 A, when evaporating the first dielectric layer;

iii) of from 270 A and 310 A, most preferably equal to about 290 A, when evaporating the second dielectric layer material.

Advantageously, using the equipment briefly described hereinabove, it is possible to carry out the coating method of the invention to form the coating shown in FIG. 1 in an overall time comprised between 15 and 35 minutes.

Preferably, said time is divided among the main operative steps as follows:

evacuation time: 8–10 min;

time for activating the hardcoat surface of the optical element: 3–5 min;

pre-heating time for the adhesion layer material: about 180 s;

deposition time for the adhesion layer: 2.5–10 s;

pre-heating time for the first dielectric layer material: about 180 s;

deposition time for the first dielectric layer: 40–300 s;

pre-heating time for the second dielectric layer material: about 180 s;

deposition time for the second dielectric layer: 7–300 s;

time for restoring the ambient pressure: about 180 s.

In this preferred embodiment, thanks to the relatively low fixed cost of said equipment and to the reduced process times, it is possible to form a mirror coating on the optical element at a cost which is comparable, as a whole, to that of the optical elements provided with a two-layered coating of the prior art, obtaining at the same time the desired improvement of the properties of adhesion and of abrasion resistance of the coating. In the alternative, it is clearly possible to carry out the method of the present invention by using more sophisticated equipment, such as those commonly employed for manufacturing coatings with greater numbers of layers, thus obtaining as good results in terms of mechanical resistance and of adhesion of the coating to the substrate, but at a reduced cost.

Additional features and advantages of the invention will become more readily apparent from the following description of some examples, which are intended as illustrative rather than limiting.

EXAMPLE 1

On 100 lenses for glasses made of Cr 39™ (PPG Industries Inc.), a mirror coating was realized, comprising:

an adhesion layer of Cr;

a first dielectric layer of $TiO_2$ (refraction index=2.25 at 500 nm);

a second dielectric layer of $SiO_2$ (refraction index=1.47 at 500 nm).

The formation of these coating layers was carried out by means of a Satis 1200 DLS coater (Satis Vacuum AG), commercially available, equipped with an electronic gun having a 15 kW power supply, an ion gun having a 9.5 kW power supply and an oxygen flow regulator.

The adhesion layer of the coating was deposited by evaporating under vacuum metallic Cr after having activated the surface of the lens by ion discharge in oxygen environment for a period of time equal to 180 s.

The deposition parameters were the following:

initial vacuum: $3*10^{-5}$ mbar;

temperature at the beginning of the deposition (measured on the lens): 60° C.;

vacuum time: 20 min;

time for activating the surface of the substrate by ion discharge: 180 s;

pre-heating time of Cr: 180 s;

deposition time of Cr: about 5 s;

pre-heating time of $TiO_2$: 180 s;

deposition time of $TiO_2$: about 120 s;

pre-heating time of $SiO_2$: 180 s;

deposition time of $SiO_2$: about 180 s;

time for restoring the ambient pressure: 15 min.

The $TiO_2$ layer was deposited by evaporating metallic Ti and introducing an $O_2$ flow equal to about 35 sccm (standard cubic centimeters per minute), whereas the final layer of $SiO_2$ was deposited in the absence of $O_2$. At the end of the deposition operations, a mirror coating, having the characteristics illustrated in the following Table I, was obtained on each lens.

EXAMPLE 2

On 100 lenses made of polycarbonate, a mirror coating was realized, comprising:

an adhesion layer of Cr;

a first dielectric layer consisting of a non-stoichiometric chromium oxide of empirical formula $Cr_xO_y$, wherein x is a number between 1 and 2 and y is a number between 1 and 3, having a refraction index comprised between 1.9 and 2.4 at 500 nm;

a second dielectric layer of SiO (refraction index =1.7 at 500 nm).

The formation of the coating layers was carried out by means of a Satis 150/S coater (Satis Vacuum AQ), commercially available, comprising a plurality of crucibles provided with electrical resistors adapted to heat the material by Joule effect.

The deposition parameters were the following:

initial vacuum: $1.1*10^{-4}$ mbar;

temperature at the beginning of the deposition (measured on the lens): 50° C.;

vacuum time: 10 min;

time for activating the surface of the substrate by ion discharge: 180 s;

pre-heating time of Cr: 180 s;

deposition time of Cr: about 5 s;

pre-heating time of Cr before deposition of $Cr_xO_y$: 180 s;

deposition time of $Cr_xO_y$: about 45 s;

pre-heating time of Si before deposition of SiO: 180 s;

deposition time of SiO: about 150 s;

time for restoring the ambient pressure: 180 s.

The $Cr_xO_y$ layer was deposited by evaporating metallic Cr and introducing an $O_2$ flow equal to about 56 sccm, whereas the layer of SiO was deposited by evaporating Si and introducing an $O_2$ flow equal to about 32.8 sccm. At the end of the deposition operations, a mirror coating, having the characteristics illustrated in the following Table II, was obtained on each lens.

EXAMPLE 3

On 100 lenses made of polycarbonate, a mirror coating was realized, comprising:

an adhesion layer of SiO (refraction index=1.7 at 500 nm);

a first dielectric layer consisting of non-stoichiometric chromium oxide of empirical formula $Cr_xO_y$, wherein x is a number comprised between 1 and 2 and y is a number comprised between 1 and 3, having a refraction index comprised between 1.9 and 2.4 at 500 nm;

a second dielectric layer of SiO (refraction index =b 1.7 at 500 nm).

The formation of the layers of the coating was carried out by means of a Satis 150/S coater (Satis Vacuum AG).

The deposition parameters were the following:

initial vacuum: $1.1*10^{-4}$ mbar;

temperature at the beginning of the deposition (measured on the lens): 50° C.;

vacuum time: 10 min;

time for activating the surface of the substrate by ion discharge: 180 s;

pre-heating time of SiO: 180 s;

deposition time of SiO: about 8 s;

pre-heating time of Cr before deposition of $Cr_xO_y$: 180 s;

deposition time of $Cr_xO_y$: about 55 s;

pre-heating time of Si before deposition of SiO: 180 s;

deposition time of SiO: about 10 s;

time for restoring the ambient pressure: 180 s.

The $Cr_xO_y$ layer was deposited by evaporating metallic Cr and introducing an $O_2$ flow equal to about 56 sccm, whereas the layer of SiO was deposited by evaporating Si and introducing an $O_2$ flow equal to about 32.8 sccm. At the end of the deposition operations, a mirror coating, having the characteristics illustrated in the following Table III, was obtained on each lens.

EXAMPLE 4

(Determination of the adhesion properties of the coating)

Figure 3:
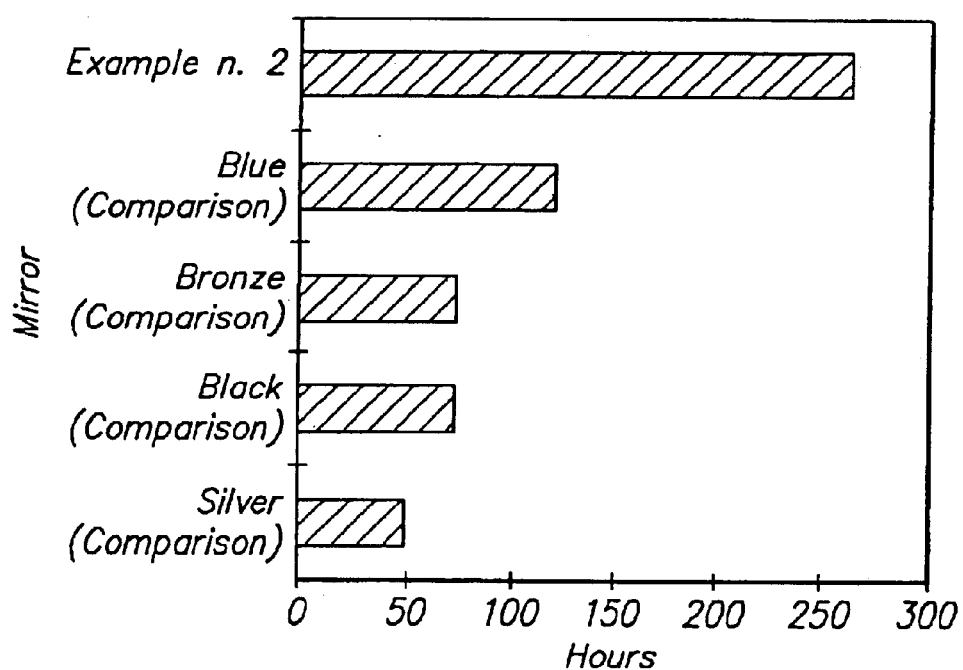
FIG. 3 is a histogram showing coating adhesion properties.

The lenses of example 2 were subjected to a standard test for determining the adhesion properties of the coating. In particular, the comparative test commonly known as Q-UV test was carried out on a set of lenses with the purpose of assessing the relative lifetime of the lenses examined in an outer environment. Such a test, aims at simulating in laboratory the harmful effects exerted by the exposition to atmospheric agents in conformity with standards ASTM G53, D-4329, SAE J2020 and ISO 4892. The results of the measurements are, graphically illustrated in FIG. 3 in which the mean lifetime expressed in hours of the lenses of example 2 are compared with the lifetimes of other lenses. In the aforementioned FIG. 3, the bars labeled Blue, Bronze, Black and Silver refer to polycarbonate lenses provided with a Cr- and SiO-based two-layered coatings. As it can be noted from the histogram reported in FIG. 3, the coating of the invention has significantly improved adhesion properties with respect to those of the two-layered coatings of known type.

EXAMPLE 5

(Determination of the abrasion resistance properties of the coating)

For the purpose of evaluating the abrasion resistance of the coating according to the previous Example 2 with respect to that of two-layered coatings of known type, another comparative test was carried out—known in the field by the name of "Steel Wool Test." Such a test is carried out by rubbing steel wool on the surface of the lens: the damage caused by the abrasion is evaluated in terms of increase of scratches on the lens. The Steel Wool Test was carried out using a modified Sutherland ink-rub tester (James River Corp.—Kalamazoo, Mich., U.S.A.), wherein the rubber pad was replaced by a flake of standard steel wool grade 000. The steel wool flake was subject to a 2-kg weight placed in oscillation for a predetermined number of abrasion cycles. The lenses were examined with a microscope and with the naked eye against an illuminated black panel after having been subject to 25 abrasion cycles.

The results, in terms of relative data, are reported in Table IV, and they fall within a range of values whose upper limit is defined by the abrasion resistance of glass, to which an evaluation equal to 5 stars is attributed, and whose lower limit corresponds to the abrasion resistance of uncoated polycarbonate, to which an evaluation equal to 0 stars is attributed.

From the comparison data reported in Table IV, it is possible to note that the plastics lenses of example 2 exhibit a higher resistance to abrasion with respect to that of the comparison lenses provided with a conventional two-layered coating, and just lower than that of the glass

EXAMPLE 6

A mirror coating is formed by depositing a 0.5 nm thick Cr adhesion layer on a hardcoated plastic lens element. A 10 nm thick $Cr_xO_y$ dielectric coating with a surface resistivity of $10^{12}$ ohms per square is deposited on the adhesion layer. A 298 nm thick $SiO_2$ dielectric layer is then deposited on the $Cr_xO_y$ layer. The resulting lens element is partially reflective and has a yellow green tint when viewed on axis.

EXAMPLE 7

A mirror coating designed to have an appearance similar to that of Example 6 is described as follows, with reference to FIG. 2. An adhesion layer (16') is formed of Cr 0.5 nm thick. A $Cr_xO_y$ layer (18') 15 nm thick is deposited; followed by a $SiO_2$ layer (20'), 140 nm thick; followed by a second $Cr_xO_y$ layer (32), 5 nm thick; followed by a second $SiO_2$ layer, (34), 82 nm thick.

TABLE I

| Layer | deposition rate [nm/s] | thickness [nm] | optical thickness at 500 nm [nm] |
|---|---|---|---|
| Cr | 0.1 | 0.50 | — |
| $TiO_2$ | 0.35 | 42.00 | 94.50 |
| $SiO_2$ | 0.96 | 173.11 | 254.47 |

TABLE II

| Layer | deposition rate [nm/s] | thickness [nm] | optical thickness at 500 nm [nm] |
|---|---|---|---|
| Cr | 0.1 | 0.50 | — |
| $Cr_xO_y$ | 0.18 | 8.00 | 17.2* |
| SiO | 1.3 | 200.00 | 340.00 |

* = value obtained considering a mean value of the refraction index equal to 2.15.

TABLE III

| Layer | deposition rate [nm/s] | thickness [nm] | optical thickness at 500 nm [nm] |
|---|---|---|---|
| SiO | 0.5 | 4.00 | — |
| $Cr_xO_y$ | 0.18 | 10.00 | 21.5* |
| SiO | 0.5 | 5.00 | 8.5 |

* = value obtained considering a mean value of the refraction index equal to 2.15.

TABLE IV

| | |
|---|---|
| Silver (comparison) | ** |
| Black (comparison) | ** |
| Bronze (comparison) | *** |
| Blue (comparison) | *** |
| Example 2 | **** |

While aspects of the present invention have been described with reference to preferred embodiments and examples, the invention to be protected is defined by the literal language of the following claims and equivalents thereof.

We claim:

1. A lens element comprising
   a lens substrate; and
   a coating carried by said lens substrate, wherein the coating includes a first dielectric layer closest to the lens substrate and a second dielectric layer formed on said first dielectric layer, wherein said first dielectric layer is formed of $Cr_xO_y$ and wherein the ratio of y to x is less than 3 to 2 and wherein the first dielectric layer is between 3 and 80 nm in thickness wherein at least three dielectric interfaces produce significant reflection from the lens element, the three interfaces being defined by the first and second dielectric layers and dielectric material immediately adjacent to the first and second dielectric layers.

2. The lens element of claim 1, wherein the first dielectric layer is formed by evaporating Cr at a controlled rate in the presence of a controlled amount of oxygen insufficient to completely oxidize the deposited chromium.

3. The lens element of claim 1, wherein the second dielectric layer is an oxide of silicon which forms the outermost layer of the coating and wherein one of said dielectric interfaces lies at a boundary between the second dielectric layer and air.

4. The lens element of claim 1, further comprising a polymer hardcoat layer on the substrate, and wherein one of said dielectric interfaces lies at a boundary between the hardcoat layer and first dielectric layer, wherein the second dielectric interface lies at a boundary between the first dielectric layer and the second dielectric layer, and wherein the third dielectric interface lies at a boundary between the second dielectric layer and air.

5. The lens effect of claim 4, wherein the index of refraction of the polymer hardcoat layer is about 1.50, the index of refraction of the first dielectric layer is greater than about 2 and the index of refraction of the second dielectric layer is about 1.5

6. The lens element of claim 1, wherein the index of refraction of the first dielectric layer is greater than about 2.

7. The lens element of claim 1, wherein the index of refraction of the first dielectric layer is about 2.15.

8. The lens element of claim 1, wherein the index of refraction of the second dielectric layer is about 1.5.

9. The lens element of claim 1, wherein the coating further comprises:
   a third dielectric layer located on the second dielectric layer, said third dielectric layer being formed of $Cr_xO_y$, wherein the ratio of y to x is less than 3 to 2; and
   a fourth dielectric layer located on the third dielectric layer, said fourth dielectric layer being formed of an oxide of silicon.

10. A mirror-coated spectacle lens element comprising:
    a lens element having a refraction index at a surface thereof in the range of 1.38 to 1.75;
    a relatively thin adhesion layer including a first material deposited on the surface of the lens element;
    a first dielectric layer including a second material having a refraction index in the range of 1.9 to 2.4, wherein the second material is selected from the group of $Cr_xO_y$, $TiO_2$, ZnSe, ZnS and mixtures thereof and wherein x is a number between 1 and 2 and y is a number between 1 and 3; and
    a second dielectric layer including a third material having a refraction index in the range of 1.4 to 1.7,
    wherein the refractive indices and thicknesses of the first and second dielectric layers are such that a mirror-coating is produced.

11. The coating of claim 10, further comprising:
    a third dielectric layer including said second material; and
    a fourth dielectric layer of a material having a refraction index lower than the refraction index of the material of the third dielectric layer.

12. The coating of claim 10, wherein the first material is Cr, the second material is $Cr_xO_y$ and the third material is an oxide of Silicon.

13. The coating of claim 10, wherein the coating further comprises:
    a primer coating; and
    a polymer hardcoat layer which forms the surface on which the thin adhesion layer is deposited.

14. The coating of claim 10, characterized in that said lens element is formed of a plastic selected from the group of: acrylic-based polymers and copolymers, polymethylmethacrylate, polycarbonate, polyolallyl-carbonates, cellulose esters, polyacrylates, polystyrene, polyurethanes.

15. The coating of claim 10, characterized in that the layer including said first material has a thickness between 0.5 and 5 nm.

16. The coating of claim 10, characterized in that the layer including said second material has a thickness between 3 and 80 nm.

17. The coating of claim 10, characterized in that the layer including said third material has a thickness between 5 and 400 nm.

18. The coating of claim 10, characterized in that said first material is selected from the group of Cr, Ti, SiO, $SiO_2$, $In_2O_3$, $SnO_2$ and mixtures thereof.

19. The coating of claim 10, characterized in that said third material is selected from the group of SiO, $SiO_2$, $MgF_2$, $Na_5Al_3F_{14}$, and mixtures thereof.

20. The coating of claim 10, wherein the coated lens element is in the form of lens or visor for glasses.

21. The coating of claim 10, wherein the coated lens element is in the form of a lens blank or protective shield.

* * * * *

UNITED STATES PATENT AND TRADEMARK OFFICE
CERTIFICATE OF CORRECTION

PATENT NO. : 6,794,066 B2
DATED : September 21, 2004
INVENTOR(S) : Marco Macchi et al.

It is certified that error appears in the above-identified patent and that said Letters Patent is hereby corrected as shown below:

<u>Title page,</u>
Item [75], Inventors, after "Brandon Yip", delete "Blackwood" and insert -- Belair --.

Signed and Sealed this

Fifth Day of April, 2005

JON W. DUDAS
*Director of the United States Patent and Trademark Office*